United States Patent [19]

Bauer

[11] Patent Number: 4,499,381

[45] Date of Patent: Feb. 12, 1985

[54] MEANS FOR CONVERTING X-RAYS INTO RADIATION WHICH DARKENS X-RAY FILMS

[75] Inventor: Walter Bauer, Munich, Fed. Rep. of Germany

[73] Assignee: Agfa-Gevaert Aktiengesellschaft, Leverkusen, Fed. Rep. of Germany

[21] Appl. No.: 463,812

[22] Filed: Feb. 4, 1983

Related U.S. Application Data

[62] Division of Ser. No. 199,377, Oct. 21, 1980, Pat. No. 4,399,363.

[30] Foreign Application Priority Data

Oct. 30, 1979 [DE] Fed. Rep. of Germany ....... 2943854

[51] Int. Cl.[3] ............ G01J 1/58

[52] U.S. Cl. ............ 250/483.1; 378/184

[58] Field of Search ............ 378/184, 185; 250/482.1, 488

[56] References Cited

U.S. PATENT DOCUMENTS

| | | | |
|---|---|---|---|
| Re. 30,045 | 7/1979 | Green | 378/184 |
| 1,610,171 | 12/1926 | Sheppard | 250/488 |
| 2,407,596 | 9/1946 | Wirshing et al. | 250/488 |
| 2,409,162 | 10/1946 | Staud | 250/488 |
| 2,950,222 | 8/1960 | Hinson | 250/488 |
| 3,177,361 | 4/1965 | Holowaty et al. | 250/488 |
| 3,704,369 | 11/1972 | Paidosh | 378/184 |

*Primary Examiner*—Bruce C. Anderson
*Attorney, Agent, or Firm*—Peter K. Kontler

[57] ABSTRACT

A laminate for conversion of X-rays into radiation that darkens X-ray films has a flexible plate which is disposed between a fluorescent layer and a ferromagnetic layer. The latter enables the plate and the fluorescent layer to bear against an X-ray film in a cassette or at an exposure station for X-ray films by being attracted to a plate-like permanent magnet. The ferromagnetic layer is permanently bonded to the respective side of the flexible plate or is simply confined between the plate and an outer layer which is permeable to X-rays and whose marginal portions extend beyond the ferromagnetic layer and are bonded to the respective marginal portions of the plate. Alternatively, the ferromagnetic layer can be inserted into a sealable envelope or bag which is bonded to the respective side of the plate, namely, to that side of the plate which away from the fluorescent layer.

16 Claims, 3 Drawing Figures

Fig. 1
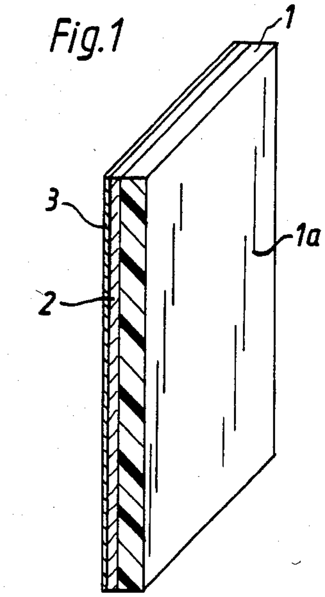
Fig. 3
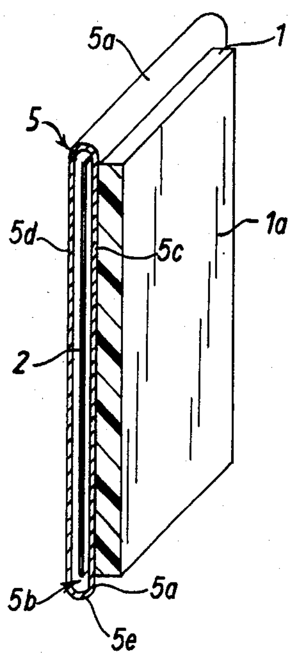
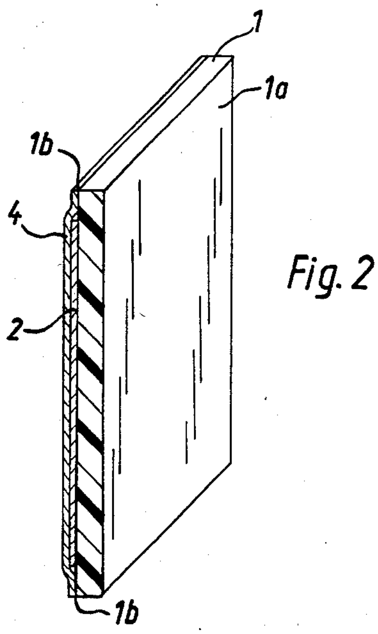
Fig. 2

MEANS FOR CONVERTING X-RAYS INTO RADIATION WHICH DARKENS X-RAY FILMS

This application is a division of application Ser. No. 199,377, filed Oct. 21, 1980, U.S. Pat. No. 4,399,363.

CROSS-REFERENCE TO RELATED CASE

The laminate of the present invention can be used in cassettes of the type disclosed in the commonly owned copending application Ser. No. 199,378 filed Oct. 21, 1980 for "Means for holding X-ray films".

BACKGROUND OF THE INVENTION

The present invention relates to improvements in apparatus for treating X-ray films, and more particularly to improvements in means for converting X-rays into radiation which darkens X-ray films. Still more particularly, the invention relates to improvements in flexible laminates wherein a plate-like carrier supports a fluorescent layer and which can be used in cassettes for X-ray films or at the exposure stations for X-ray films which are not stored in cassettes.

It is known to maintain the plate with the fluorescent layer at a fixed distance from (i.e., in requisite contact with) an X-ray film while the film is stored in a cassette by providing the cassette with a magnetic layer which cooperates with a ferromagnetic foil. The magnetic layer attracts the foil whereby the plate and the fluorescent layer, both disposed between the magnetic layer and the ferromagnetic foil, are urged against the magnetic layer which, in turn, is mounted on the bottom wall of the cassette. Flexible plates of the just outlined character are known as intensifying screens and contribute significantly to the making of sharp X-ray images. In most instances, X-ray films are stored in cassettes for convenient manipulation preparatory to and/or during transport to the exposure station as well as during transfer from the exposure station to the developing station. However, it is also known to operate without cassettes, i.e., X-ray films can be stored in a magazine, withdrawn from the magazine for delivery to the exposure station, and transferred from the exposure station to the developing station. The exposure station is then provided with the aforediscussed plate having a fluorescent layer to convert X-rays into radiation of the type which is capable of darkening an X-ray film. The requirements regarding proper contact between an X-ray film and the plate with a fluorescent layer thereon must be satisfied irrespective of whether the X-ray film is or is not stored in a cassette.

German Pat. No. 1,112,887 discloses a cassette for X-ray films wherein a plate-like flap of elastomeric material exhibits magnetic properties and cooperates with an iron foil which is attached or otherwise applied to the bottom wall of the cassette. As a rule, the iron foil is bonded to the bottom wall and is likely to be scratched or otherwise damaged when the cassette is in use. Replacement of a damaged iron foil is time-consuming and expensive. In most instances, such replacement involves scraping the remnants of a damaged iron foil off the bottom wall of the cassette prior to bonding of a fresh foil to the cleaned bottom wall.

OBJECTS AND SUMMARY OF THE INVENTION

An object of the invention is to provide a novel and improved laminate which can maintain a fluorescent layer in requisite position with reference to an X-ray film regardless of whether the film is or is not confined in a cassette.

Another object of the invention is to provide a laminate which is constructed and assembled in such a way that the likelihood of damage to its ferromagnetic component is greatly reduced or eliminated in a simple and inexpensive manner.

A further object of the invention is to provide a novel and improved laminate which can be used for conversion of X-rays into radiation that darkens X-ray films regardless of whether the films are stored in cassettes or are supported by other types of holders at the exposure stations of X-ray machines.

An additional object of the invention is to provide the laminate with novel and improved means for protecting the ferromagnetic layer from scratches and/or other damage.

A further object of the invention is to provide a laminate which is constructed and assembled in such a way that the ferromagnetic layer can be removed and replaced with a minimum of effort, with little loss in time and at a reasonable cost.

Another object of the invention is to provide a laminate which is sufficiently inexpensive to warrant its use as an expendable component of X-ray equipment.

An additional object of the invention is to provide a laminate whose desirable characteristics are not affected by relatively small or even by pronounced changes in temperature.

The invention is embodied in a flexible laminate for conversion of X-rays into radiation which effects darkening of X-ray film in a cassette or another holder at the exposure station for X-ray films. The laminate comprises a flexible plate having a first side and a second side, a fluorescent layer at one side of the plate, and a ferromagnetic layer (e.g., a foil which is made of steel) at the other side of the plate.

In accordance with a first embodiment of the invention, the ferromagnetic layer can be bonded to the respective side of the plate, and the bond can be established by a suitable adhesive, by rolling the ferromagnetic layer onto the other respective side of the plate, or by the application of heat and pressure.

Alternatively, the ferromagnetic layer may abut against but need not be bonded to the respective side of the plate. This can be accomplished by employing a ferromagnetic layer which is somewhat smaller than the plate so that the marginal portions of the respective side of the plate extend beyond the respective edges of the ferromagnetic layer. The laminate then further comprises an outer layer of a material which is permeable to X-rays, which overlies that side of the ferromagnetic layer which faces away from the respective side of the plate, and which is bonded to the marginal portions of this side of the plate. Thus, the ferromagnetic layer is then disposed between the plate and the outer layer. The same result can be achieved by inserting the ferromagnetic layer into a receptacle (e.g., an envelope or a bag) which is attached to the respective side of the plate. One marginal portion of the receptacle can be provided with a preferably sealable opening which allows for insertion or removal of the ferromagnetic layer.

The novel features which are considered as characteristic of the invention are set forth in particular in the appended claims. The improved laminate itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary perspective view of a laminate which embodies one form of the invention and wherein the ferromagnetic layer is bonded to the respective side of the plate;

FIG. 2 is a similar fragmentary perspective view of a second laminate wherein the ferromagnetic layer is confined between the respective side of the plate and an outer layer which is permeable to X-rays and has marginal portions bonded to the respective marginal portions of the respective side of the plate; and FIG. 3 is a fragmentary perspective view of a third laminate wherein the ferromagnetic layer is confined in a flat receptacle adhering to the respective side of the plate.

DESCRIPTION OF THE PREFERRED EMBODIMENTS

Referring first to FIG. 1, there is shown a flexible laminate which comprises a relatively thick flexible plate 1 one side or surface of which is coated with a layer or film 1*a* of fluorescent material serving to convert X-rays into radiation that darkens an X-ray film in a cassette or the like. The other side or surface of the plate 1 is bonded to a ferromagnetic layer 2, e.g., a foil which consists of steel or the like. The layer 2 is bonded to the respective side of the plate 1 by a suitable adhesive, by rolling, or by the simultaneous application of heat and pressure. The thickness of the layer 2 (particularly if this layer is a steel foil) need not exceed a small fraction of one millimeter, e.g., 0.02 mm. The laminate of FIG. 1 further comprises an outer layer 3 which consists of corrosion-resistant material (e.g., lacquer) and overlies that side or surface of the ferromagnetic layer which faces away from the plate 1. The layer 3 may be made of any material which can prevent corrosion of the ferromagnetic layer 2 and can be readily bonded or otherwise secured to the layer 2.

The layer 1 may consist of rubber or elastomeric synthetic plastic material.

FIG. 2 illustrates a portion of a second flexible laminate wherein one side of the flexible plate 1 carries a film or layer 1*a* of fluorescent material and the other side of the plate 1 is adjacent to a ferromagnetic layer 2 which may but need not necessarily constitute a steel foil. The dimensions of the layer 2 are smaller than those of the plate 1 so that the marginal portions 1*b* of that side of the plate 1 which is adjacent to the layer 2 extend outwardly and beyond the respective edges of the layer 2. The laminate of FIG. 2 further comprises an outer layer 4 which consists of a material that is capable of preventing corrosion of the layer 2. The layer 2 is disposed or confined between the outer layer 4 and the plate 1, and the marginal portions of the outer layer 4 are bonded or otherwise secured to the marginal portions 1*b* of the plate 1. The thus bonded marginal portions 1*b* of the plate 1 and outer layer 4 form a circumferentially complete polygonal frame around the ferromagnetic layer 2. The dimensions of the outer layer 4 preferably match those of the plate 1.

The ferromagnetic layer 2 need not be bonded to the respective side of the plate 1 and/or to the outer layer 4. This is often desirable and advantageous, for example, when the heat expansion coefficient of the material of the plate 1 is different from the heat expansion coefficient of the layer 2 and the laminate of FIG. 2 is used under circumstances which involve changes of temperature within a rather wide range. Thus, the fact that the layer 2 may expand or contract at a different rate than the plate 1 (in response to heating or cooling of the laminate) does not affect the possibility of maintaining the layer 2 in intimate contact with the respective side of the plate 1, namely, with that side which faces away from the fluorescent layer 1*a*. In other words, the plate 1 cannot cause wrinkling or cracking of the layer 2, even if the temperature of the laminate shown in FIG. 2 fluctuates within a rather wide range. The outer layer 4 constitutes a protective film which shields the layer 2 from corrosion and consists of a material which is permeable to X-rays. Thus, in addition to performing other desirable functions, the outer layer 4 can be used as a substitute for the outer layer 3 shown in FIG. 1.

FIG. 3 illustrates a third flexible laminate which comprises a flexible plate 1 carrying a film or layer 1*a* of fluorescent material and an envelope, bag or an analogous receptacle 5 for the ferromagnetic layer 2. In this embodiment of the laminate, the ferromagnetic layer 2 need not directly contact the respective side of the plate 1 because a panel 5*c* of the receptacle 5 is disposed between the parts 1 and 2. The panel 5*c* can be bonded to the respective side of the plate 1 by a suitable adhesive.

The receptacle 5 is preferably provided with an opening 5*b* which extends along one of its marginal portions 5*a* and can be sealed or at least tightly closed by a flap 5*e* or the like. The opening 5*b* allows for insertion of the ferromagnetic layer 2 into or for withdrawal of such layer from the receptacle 5. If desired, the ferromagnetic layer 2 can be simply inserted into and loosely confined in the interior of the receptacle 5. Alternatively, the laminate of FIG. 3 may comprise several bonds (e.g., spots of adhesive) which secure selected portions of the ferromagnetic layer 2 to the panel 5*c*, i.e., to that panel which is adjacent to the respective side of the plate 1.

The laminate of FIG. 3 exhibits several advantages including those which are pointed out in connection with the description of the laminate shown in FIG. 2. Thus, the difference (if any) between the heat expansion coefficients of the ferromagnetic layer 2 and plate 1 cannot affect the relative positions of these parts, i.e., the layer 2 cannot be wrinkled or otherwise damaged or distorted if the heat expansion coefficient of its material deviates from that of the material of the plate 1. Moreover, the laminate of FIG. 3 can be readily inserted into or withdrawn from a cassette or an analogous container for X-ray films as well as held at the exposure station for X-ray films (if the nature of the operation is such that the X-ray film is not confined in cassettes but is advanced to and from the exposure station without resorting to cassettes). If the laminate of FIG. 3 is to be confined in a cassette for X-ray films, the panel 5*d* of the receptacle 5 can be readily attached to a wall of the cassette. Analogously, the panel 5*d* can be readily attached to a holder at the exposure station for X-ray films which are not confined in cassettes. The attachment of the panel 5*d* to a cassette or to a holder can be effected by resorting to a suitable adhesive; such mode of attaching the panel 5*d* is preferred at this time but does not constitute the sole acceptable procedure of securing the receptacle 5 to a cassette, a holder or the like.

An important advantage of the improved laminate is that the ferromagnetic layer 2 can be replaced simultaneously with the intensifying screen including the plate 1 and fluorescent layer 1*a*. Thus, and referring again to FIG. 1, the ferromagnetic layer 2 will be replaced when the parts 1 and 1*a* of the laminate are replaced because the layer 2 is permanently bonded to the respective side of the plate 1. This does not contribute significantly to the cost of the machine or equipment in which the laminate is used because, as a rule, the cost of the ferromagnetic layer 2 is a minute fraction (e.g., approximately one percent) of the cost of the entire laminate. Thus, the ferromagnetic layer 2 of the laminate shown in FIG. 1 will be replaced, regardless of whether or not the layer 2 is damaged, whenever the plate 1 is replaced. The same holds true for the laminate of FIG. 2, and it can also hold true for the laminate of FIG. 3 (even though the layer 2 can be replaced independently of the receptacle 5 and parts 1 and 1*a*). In each instance, the cost of replacing the ferromagnetic layer 2 is but a minute fraction of the cost of replacing a ferromagnetic (e.g., iron) layer which is bonded to the bottom wall of a cassette in a manner as disclosed in the aforementioned German Pat. No. 1,112,887.

Another important advantage of the improved laminate is that the position of the layer 2 with reference to the plate 1 and layer 1*a* is much less likely to change than in heretofore known constructions or cannot change at all. This, in turn, enhances the positioning of the layer 1*a* and plate 1 relative to an X-ray film regardless of whether the film is stored in a cassette or is supported in or by other types of holder means. Proper positioning of the layer 1*a* relative to the X-ray film is particularly important in relatively large cassettes which consist of a synthetic plastic material and wherein the bottom walls and covers or lids are not always exactly flat in each and every region thereof. There the provision of a flexibie (deformable) plate 1 with a flexible layer 1*a* of fluorescent material at one side and a flexible layer 2 of ferromagnetic material at the other side thereof 1 contributes significantly to optimum positioning of the layer 1*a* relative to the X-ray film. Flexibility of the laminate shown in FIGS. 1, 2 and 3 is desirable in the just discussed cassettes because a deformable laminate can readily follow the outline of a flat wall or the outline of a wall which is partially flat and partially convex, concave or otherwise departs from plane configuration. The configuration of the walls of the cassette, in turn, determines the configuration of the X-ray film therein. Were the layers 1*a* and 2 incapable of following the outline or configuration of an X-ray film in a cassette, the equipment using the X-ray film would be incapable of furnishing sharp images in each and every zone of such X-ray film.

Still another advantage of the improved laminate is that it can employ an extremely thin ferromagnetic layer so that the percentage of X-rays which are absorbed by such layer is negligible. As mentioned above, the thickness of the layer 2 can be a minute fraction of one millimeter (e.g., 0.02 mm).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A flexible laminate to be removably positioned in a holding arrangement for x-ray film during exposure of the latter, said laminate comprising:
(a) a flexible plate;
(b) a flexible fluorescent layer at one side of said plate for intensifying x-rays to which the film is exposed; and
(c) a flexible ferromagnetic layer at the other side of said plate for cooperating with a magnetic element of the holding arrangement so as to urge said fluorescent layer towards the film.

2. The laminate of claim 1, wherein said ferromagnetic layer is a foil.

3. The laminate of claim 1, wherein said ferromagnetic layer is bonded to said other side of said plate.

4. The laminate of claim 3, wherein the bond between said ferromagnetic layer and said plate is established by an adhesive.

5. The laminate of claim 3, wherein the bond between said ferromagnetic layer and said plate is established by rolling said ferromagnetic layer onto said other side of said plate.

6. The laminate of claim 3, wherein the bond between said ferromagnetic layer and said plate is established by the application of heat and pressure.

7. The laminate of claim 1, wherein said ferromagnetic layer has a side facing away from said other side of said plate, and further comprising a corrosion-resistant outer layer overlying said side of said ferromagnetic layer.

8. The laminate of claim 7, wherein said outer layer consists of lacquer.

9. The laminate of claim 1, wherein said other side of said plate has marginal portions extending beyond said ferromagnetic layer.

10. The laminate of claim 9, further comprising an outer layer bonded to said marginal portions of said plate, said ferromagnetic layer being confined between said plate and said outer layer.

11. The laminate of claim 10, wherein said outer layer is permeable to X-rays.

12. The laminate of claim 1, wherein said plate is non-metallic.

13. The laminate of claim 12, wherein said plate comprises rubber.

14. The laminate of claim 12, wherein said plate comprises a synthetic plastic material.

15. The laminate of claim 1, wherein said ferromagnetic layer is free to expand and contract relative to said plate.

16. The laminate of claim 7, wherein said ferromagnetic layer is free to expand and contract relative to said plate and said outer layer.

* * * * *